United States Patent
Ma et al.

(10) Patent No.: US 11,173,947 B2
(45) Date of Patent: Nov. 16, 2021

(54) DRIVING CONTROL DEVICE, VEHICLE AND DRIVING CONTROL METHOD

(71) Applicants: BOE Technology Group Co., Ltd., Beijing (CN); Hefei BOE Optoelectronics Technology Co., Ltd., Anhui (CN)

(72) Inventors: Xinchen Ma, Beijing (CN); Duo Zhang, Beijing (CN); Jin Sha, Beijing (CN); Zhongqi Zhang, Beijing (CN); Zhaobo Jiang, Beijing (CN); Yansheng Hu, Beijing (CN)

(73) Assignees: BOE Technology Group Co., Ltd., Beijing (CN); Hefei BOE Optoelectronics Technology Co., Ltd., Anhui (CN)

( * ) Notice: Subject to any disclaimer, the term of this patent is extended or adjusted under 35 U.S.C. 154(b) by 554 days.

(21) Appl. No.: 16/091,325

(22) PCT Filed: Feb. 28, 2018

(86) PCT No.: PCT/CN2018/077577
§ 371 (c)(1),
(2) Date: Oct. 4, 2018

(87) PCT Pub. No.: WO2018/201782
PCT Pub. Date: Nov. 8, 2018

(65) Prior Publication Data
US 2021/0206422 A1    Jul. 8, 2021

(30) Foreign Application Priority Data

May 5, 2017    (CN) .......................... 201710313884.X

(51) Int. Cl.
*B62D 1/28*    (2006.01)
*G06F 3/044*   (2006.01)
(Continued)

(52) U.S. Cl.
CPC ............ *B62D 1/28* (2013.01); *B60K 31/0058* (2013.01); *G06F 3/044* (2013.01);
(Continued)

(58) Field of Classification Search
None
See application file for complete search history.

(56) References Cited

U.S. PATENT DOCUMENTS

2004/0252013 A1    12/2004   Fuks et al.
2014/0365076 A1    12/2014   Cash
(Continued)

FOREIGN PATENT DOCUMENTS

CN    102529885 A    7/2012
CN    203157741 U    8/2013
(Continued)

OTHER PUBLICATIONS

English machine translation of Japanese patent publication JP 2016137785. (Year: 2016).*
(Continued)

*Primary Examiner* — Nicholas J Lee
(74) *Attorney, Agent, or Firm* — Banner & Witcoff, Ltd.

(57) ABSTRACT

A driving control device includes a touch unit configured to acquire fingerprint information of a user and generate touch signals according to the fingerprint information, in which the touch signals include the fingerprint information; and a controller configured to generate driving control signals according to the fingerprint information in the touch signals and output the driving control signals to a vehicle to control traveling parameters of the vehicle. A vehicle and a driving control method are further provided.

17 Claims, 5 Drawing Sheets

(51) Int. Cl.
*G06K 9/00* (2006.01)
*B60K 31/00* (2006.01)
(52) U.S. Cl.
CPC .................. *G06K 9/00087* (2013.01); *G06F 2203/04104* (2013.01); *G06F 2203/04105* (2013.01)

(56) References Cited

U.S. PATENT DOCUMENTS

| | | | |
|---|---|---|---|
| 2016/0085332 A1* | 3/2016 | Herrera-Morales | G02B 27/18 345/175 |
| 2016/0090104 A1 | 3/2016 | Diaz-Jimenez et al. | |

FOREIGN PATENT DOCUMENTS

| | | |
|---|---|---|
| CN | 103507814 A | 1/2014 |
| CN | 104554148 A | 4/2015 |
| CN | 104598108 A | 5/2015 |
| CN | 104691450 A | 6/2015 |
| CN | 105459817 A | 4/2016 |
| CN | 106467065 A | 3/2017 |
| CN | 107054443 A | 8/2017 |
| DE | 10318713 A1 | 12/2003 |
| JP | 2016137785 A | 8/2016 |
| WO | 2015126145 A1 | 8/2015 |

OTHER PUBLICATIONS

May 5, 2019—(CN) Second Office Action Appn 201710313884.X with English Translation.

Sep. 3, 2019—(CN) Third Office Action Appn 201710313884.X with English Translation.

May 24, 2018—(WO) International Search Report and Written Opinion Appn PCT/CN2018/077577 with English Translation.

Oct. 9, 2018—(CN) First Office Action Appn 201710313884.X with English Translation.

* cited by examiner

DRIVING CONTROL DEVICE, VEHICLE AND DRIVING CONTROL METHOD

The application is a U.S. National Phase Entry of International Application No. PCT/CN2018/077577 filed on Feb. 28, 2018, designating the United States of America and claiming priority to Chinese Patent Application No. 201710313884.X filed on May 5, 2017. The present application claims priority to and the benefit of the above-identified applications and the above-identified applications are incorporated by reference herein in their entirety.

TECHNICAL FIELD

Embodiments of the present disclosure relate to a driving control device, a vehicle and a driving control method.

BACKGROUND

Traditional manual transmission driving system and automatic transmission driving system generally include a direction control sub-system and a speed control sub-system. The direction control sub-system mainly includes a steering wheel, and the speed control sub-system mainly includes a joystick, a clutch, a throttle and a brake.

Since the driver needs to operate the direction control sub-system and the speed control sub-system at the same time while driving, he or she must take driving actions with hands and feet at the same time. These driving actions not only requires that the driver has a certain capability of synergic operation with limbs, but also some complicated driving actions may have some operating difficulty for a new driver, which leads to the high accident rate during initial driving.

SUMMARY

According to at least one embodiment of this disclosure, a driving control device is provided, it comprises: a touch unit configured to acquire fingerprint information of a user and generate touch signals according to the fingerprint information, the touch signals comprising the fingerprint information; and a controller configured to generate driving control signals according to the fingerprint information in the touch signals and output the driving control signals to the vehicle to control traveling parameters of the vehicle.

For example, the traveling parameters comprise at least one of traveling direction or traveling speed.

For example, the controller comprises: a receiver configured to receive touch signals generated by the touch unit; a memory configured to store fingerprints and functions corresponding to the fingerprints as well as a correspondence between the fingerprints and turnings of the vehicle, wherein the functions corresponding to the fingerprints comprise controlling direction; a sub-controller configured to determine a turning direction and a turning angle of the vehicle according to fingerprint information in the touch signals received in the receiver, fingerprints and functions corresponding to fingerprints and the correspondence between the fingerprints and turnings of the vehicle stored in the memory.

For example, the correspondence between the fingerprints and turnings of the vehicle comprises the correspondence between fingerprints and turning angles; the sub-controller is further configured to compare fingerprints in fingerprint information of the touch signals against fingerprints stored in the memory and determine a fingerprint for controlling direction in the fingerprint information according to functions corresponding to fingerprints stored in the memory; and determine the turning direction and the turning angle of the vehicle according to the fingerprint that is determined for controlling direction and the correspondence between the fingerprint and the turning angle, wherein the turning angle is an angle between a direction into which the vehicle is to turn and a straightforward direction directly in front of the vehicle.

For example, the correspondence between the fingerprints and turnings of the vehicle comprises the correspondence between fingerprints and directions; the sub-controller is further configured to compare fingerprints in fingerprint information of the touch signals against fingerprints stored in the memory and determine a fingerprint configured to control direction in the fingerprint information according to functions corresponding to fingerprints stored in the memory; and determine the turning direction of the vehicle according to the fingerprint that is determined to be configured to control direction and the correspondence between the fingerprints and directions.

For example, the sub-controller is further configured to determine the touch duration of the fingerprint configured to control direction, and determine the turning angle of the vehicle according to the touch duration, in which the turning angle of the vehicle increases as the touch duration of fingerprint increases.

For example, when the fingerprints that are determined for controlling direction comprise at least two fingerprints and the at least two fingerprints correspond to at least two turning angles, the sub-controller is configured to determine the turning direction and the turning angle of the vehicle according to the at least two turning angles corresponding to the at least two fingerprints.

For example, the touch unit is further configured to detect pressure information, the pressure information comprises pressure applied on the touch unit by fingers of the user; acquire the fingerprint information when pressure of at least one finger in the detected pressure information reaches a threshold; wherein the fingerprint information comprises fingerprints of all fingers that can be detected by the touch unit, or the fingerprint information comprises fingerprints of fingers applying pressure that reaches the threshold.

For example, the touch signals further comprise the pressure information, and the functions corresponding to the fingerprints further comprise controlling an upper speed limit; the memory is further configured to store the correspondence between the pressure and the upper speed limit; the sub-controller is further configured to determine the upper speed limit of the vehicle according to the fingerprint information in the touch signals, the pressure information in the touch signals, the fingerprints and functions corresponding to fingerprints, as well as the correspondence between the pressure and the upper speed limit stored in the memory.

For example, the sub-controller is configured to compare fingerprints in the fingerprint information against fingerprints stored in the memory, and determine a fingerprint that is configured to control the upper speed limit in the fingerprint information according to functions corresponding to fingerprints stored in the memory; determine a pressure corresponding to the fingerprint that is determined for controlling the upper speed limit according to the fingerprint that is determined to be configured to control the upper speed limit and the pressure information; and determine the upper speed limit of the vehicle according to the pressure corresponding to the fingerprint configured to control the upper speed limit and the correspondence between the pressure and the upper speed limit.

For example, functions corresponding to the fingerprints further comprise controlling the upper speed limit; the memory is further configured to store the correspondence between the fingerprints and the upper speed limits; and the sub-controller is further configured to determine the upper speed limit of the vehicle according to the fingerprint information, the fingerprints and functions corresponding to fingerprints, as well as the correspondence between fingerprints and upper speed limits stored in the memory.

For example, the sub-controller is further configured to generate corresponding driving control signals according to the determined turning direction and the turning angle of the vehicle and the determined upper speed limit of the vehicle.

For example, the touch unit comprises a base and a touch panel disposed on the base.

For example, the touch panel is a semi-sphere touch panel or a curved surface touch panel.

For example, the touch unit further comprises a palm supporting section disposed over the touch panel.

For example, the palm supporting section is configured to acquire palmprint information of the user; and the controller is further configured to compare the palmprint information and preset palmprint information and control the touch panel to be turned on when the palmprint information is identical to the preset palmprint information.

For example, the controller is disposed within the base, and the driving control device further comprises a data transfer interface disposed on the base, wherein the controller is electrically connected with the vehicle through the data transfer interface.

According to at least one embodiment of this disclosure, a vehicle is provided, it comprises the driving control device above.

For example, the vehicle further comprises a driving unit configured to receive the driving control signals and control the vehicle according to the driving control signals.

According to at least one embodiment of this disclosure, a driving control method is provided, it comprises: acquiring fingerprint information of a user and generating touch signals according to the fingerprint information, wherein the touch signals comprise the fingerprint information; and generating driving control signals according to the fingerprint information in the touch signals and outputting the driving control signals to the vehicle to control traveling parameters of the vehicle.

For example, the traveling parameters comprise at least one of traveling direction or traveling speed.

BRIEF DESCRIPTION OF THE DRAWINGS

In order to make the embodiments of the disclosure apparent, the drawings related to the embodiments of the disclosure will be described briefly. Apparently, the described embodiments are just a part of the embodiments of the disclosure. For those skilled in the art, he or she can obtain other figure(s) according to these figures, without any inventive work.

DETAILED DESCRIPTION

In order to make the object, technical solution and advantages of the present disclosure clearer, embodiments of the present disclosure will be explained in detail below with reference to accompany drawings.

Figure 1:
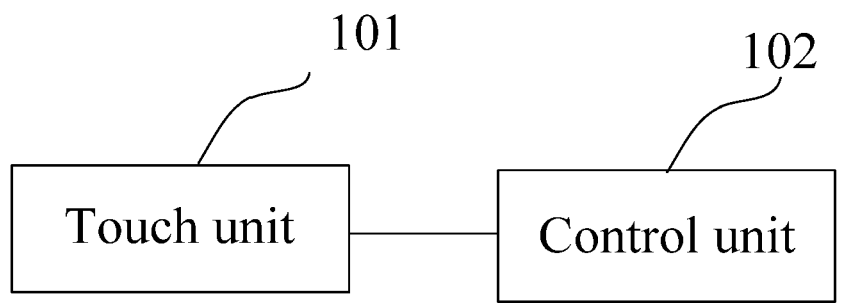
FIG. 1 is a structure block diagram of a driving control device provided in an embodiment of the present disclosure.

FIG. 1 is a structure block diagram of a driving control device provided in an embodiment of the present disclosure. Referring to FIG. 1, the driving control device includes a touch unit 101 and a control unit 102. The touch unit 101 is configured to acquire fingerprint information of the user and generate touch signals according to the fingerprint information. The touch signals include the fingerprint information. The touch unit 101 may be for example a touch screen, a touch panel etc. The control unit 102 is configured to generate driving control signals according to the fingerprint information in the touch signals and output the driving control signals to the vehicle to control traveling parameters of the vehicle. Traveling parameters include for example a traveling direction and an upper speed limit, and of course may be other traveling parameters. The control unit 102 may be for example a processor, a single chip microcomputer, or a microprocessor.

In embodiments of the present disclosure, the control over at least one of the traveling direction and the upper speed limit of a vehicle is implemented by touch operations of the user's finger and the driving control device may be used with the throttle and brake while driving. While controlling direction with the device, the driver simply needs to control direction by touch without keeping rotating the steering wheel, which simplifies the direction control operation, reduces driving difficulty and in turn decreases the driving accident rate. While controlling upper speed limit with the device, the driver sets the upper speed limit for the vehicle by touch such that the upper speed limit will not be exceeded while the driver is driving, which avoids the overspeed problem due to improper operation by the driver, reduces the difficulty for the driver to control the throttle and gears, and reduces driving accident rate.

According to one embodiment of the present disclosure, in embodiments of the present disclosure, the vehicle mainly refers to automobiles such as cars and buses. Of course, ships and airplanes are also included in the scope of vehicles as used in embodiments of the present disclosure.

In embodiments of the present disclosure, by controlling travel direction of a vehicle, it means to control the direction of turning by the vehicle such as left, right and backward, and the turning angle such as 5, 30, 60 and 180 degrees. By controlling the upper speed limit of a vehicle, it means to control the maximum speed at which the vehicle travels, while the traveling speed may be implemented by the driver by controlling the throttle and the brake.

Figure 2:
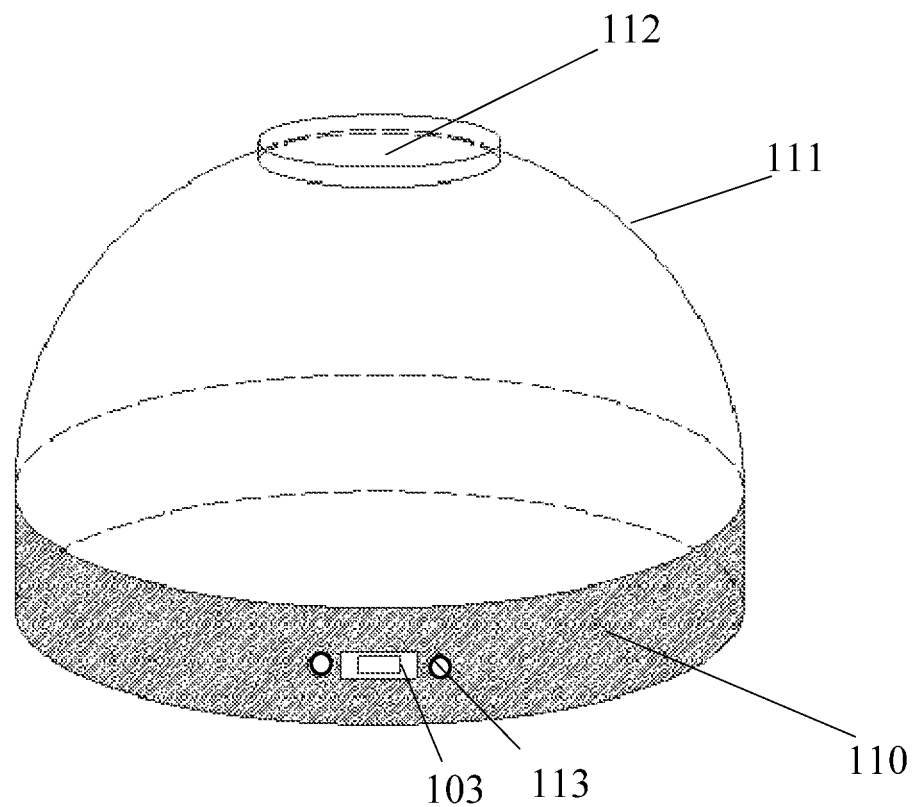
FIG. 2 is a structure diagram of a driving control device provided in an embodiment of the present disclosure.
Figure 3:
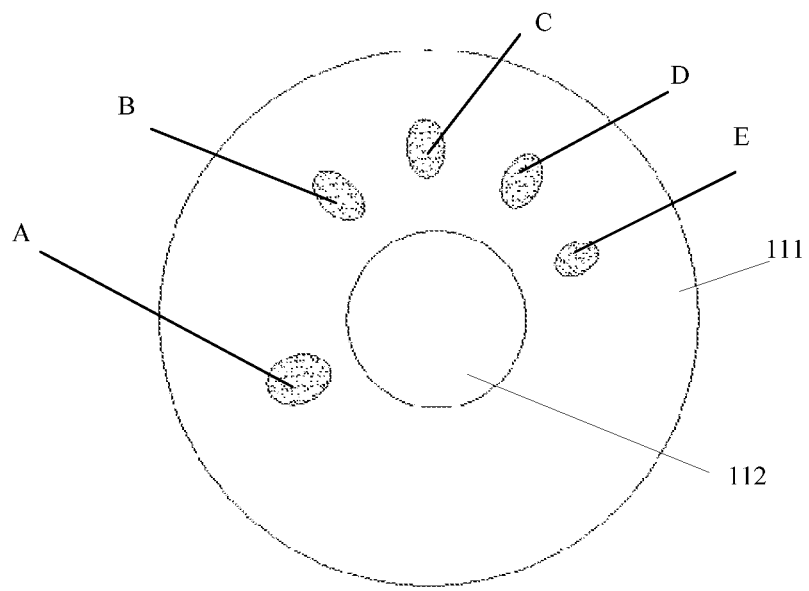
FIG. 3 is a structure diagram of a driving control device provided in an embodiment of the present disclosure.

FIGS. 2 and 3 are structure diagrams of a driving control device provided in an embodiment of the present disclosure. Referring to FIGS. 2 and 3, the touch unit 101 may include a base 110 and a touch panel 111 disposed on the base 110, which has the fingerprint identification function. Disposing the touch panel 111 on the base 110 facilitates the placing and mounting of the touch unit in the vehicle and enables the touch unit to be placed at different locations inside the car.

In embodiments of the present disclosure, the touch panel 111 may be of an integral structure and may also include a plurality of sub-touch-panels.

Figure 4A:
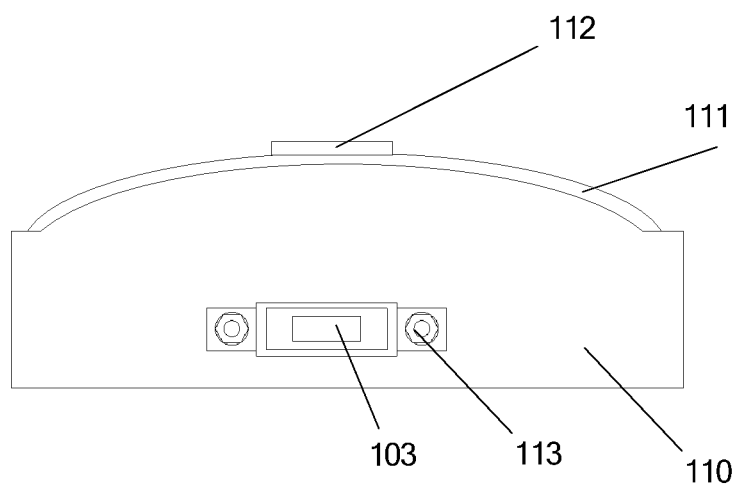
FIG. 4A is a structure diagram of another driving control device provided in an embodiment of the present disclosure.
Figure 4B:
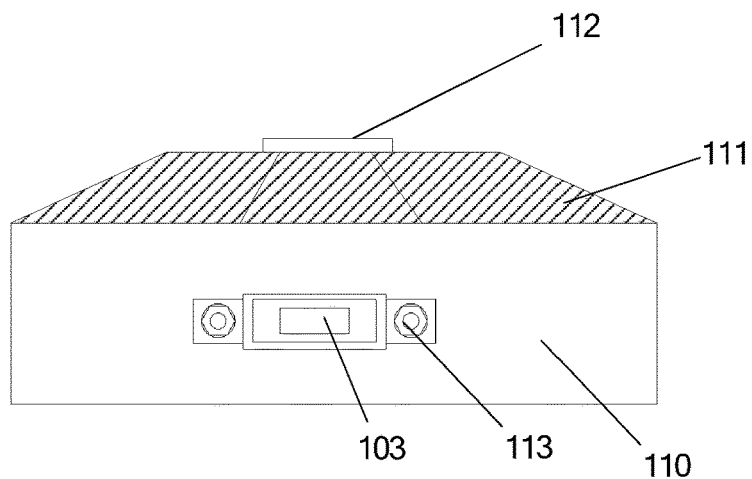
FIG. 4B is a structure diagram of another driving control device provided in an embodiment of the present disclosure.
Figure 4C:
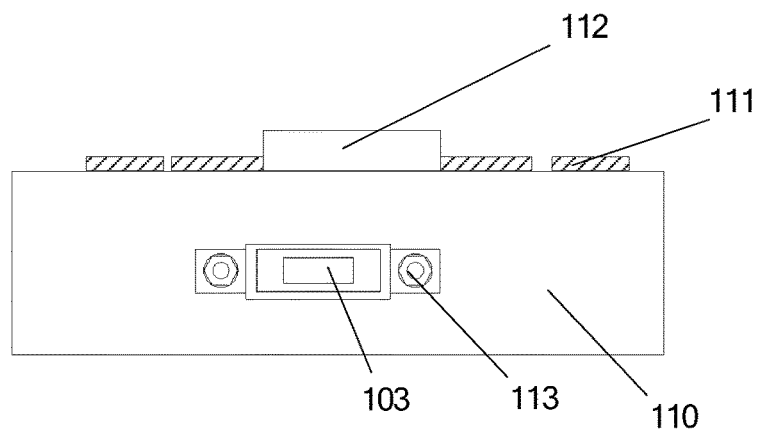
FIG. 4C is a structure diagram of another driving control device provided in an embodiment of the present disclosure.
Figure 4D:
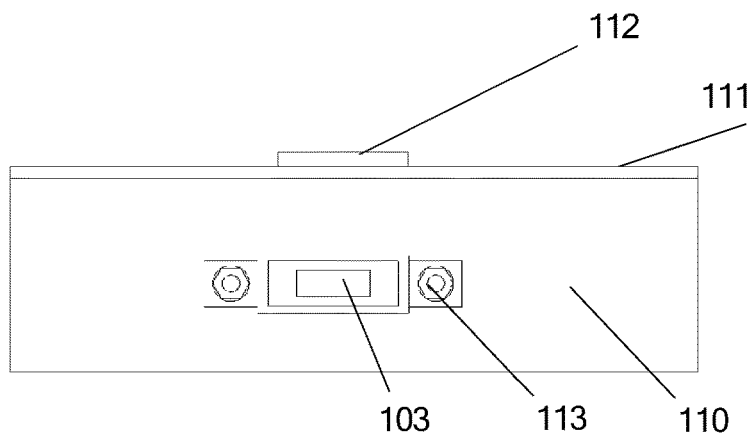
FIG. 4D is a structure diagram of another driving control device provided in an embodiment of the present disclosure.

When the touch panel 111 is of an integral structure, the touch panel 111 may be a semi-sphere touch panel (as shown in FIG. 2), or a curved surface touch panel (as shown in FIG. 4A) or a planar surface touch panel (as shown in FIG. 4D). When a semi-sphere touch panel or a curved surface touch panel is used, the user's touch operation may be facilitated; and when a planar surface touch panel is used, the implementation is easy.

When the touch panel 111 includes a plurality of sub-touch-panels, the touch panel 111 may be formed by tiling a plurality of sub-touch-panels that surround a circular truncated cone or a truncated pyramid (as shown in FIG. 4B), or the touch panel 111 includes a plurality of sub-touch-panels disposed separately each of which is a planar surface touch panel (as shown in FIG. 4C). The touch panel 111 includes a plurality of sub-touch-panels which enables each finger to correspond to one sub-touch-panel, thereby facilitating detection of touch signals.

As shown in FIGS. 2 and 3, the touch unit 101 may further include a palm supporting section 112 disposed over the touch panel 111 such as the sphere-shaped top of the semi-sphere touch panel 111. By disposing the palm supporting section 112, while using, the palm may be placed on the palm supporting section 112 with fingers extending down to touch the touch panel 111, which facilitates the user's operation. And the palm supporting section 112 may also function to isolate the palm and the touch panel 111, thereby avoiding mis-operation by the palm.

Optionally, the palm supporting section 112 is configured to acquire the user's palmprint information, that is, the palm supporting section 112 may be a touch panel separate from the touch panel 111 and electrically connected with the control unit 102. The control unit 102 is further configured to compare the palmprint information and the preset palmprint information and control the touch panel to be turned on when the palmprint information is identical to the preset one. Controlling turning on of the touch panel by palmprint identification enhances the security performance. The touch panel being turned on means that the touch panel is capable of touch sensing operation such as acquiring fingerprint information.

In one implementation of embodiments of the present disclosure, the control unit 102 may be disposed within the base 110 so as to save space and facilitate handling of the entire device. In one implementation of embodiments of the present disclosure, the control unit 102 may further be integrated on the vehicle, such as on the main control system of the vehicle.

When the control unit 102 may be disposed within the base 110, the driving control device may further include a data transfer interface 103 disposed on the base 110. As illustrated in FIG. 2, the control unit 102 is electrically connected with the vehicle through the data transfer interface 104, thereby realizing transmission of driving control signals.

In accordance with one embodiment of the present disclosure, the control unit 102 may be electrically connected with the main control system of the vehicle via the data transfer interface 104.

In accordance with one embodiment of the present disclosure, an interface is also provided on the main control system, the data transfer interface 103 is connected the interface of the main control system via a data connection line. The two ends of the data connection line are provided with connection terminals for mating the data transfer interface 103 and the interface of the main control system respectively.

Figure 5:
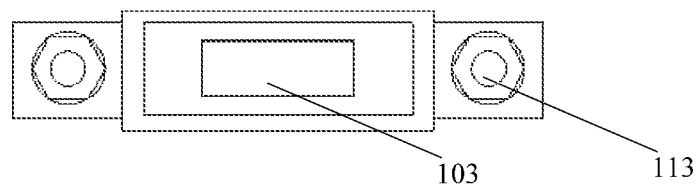
FIG. 5 is a structure diagram of a data transfer interface provided in an embodiment of the present disclosure.

Further, in order to guarantee the fastening degree of connection between the data transfer interface 103 and the data connection line and prevent the data line from disconnecting during use, two screw holes 113 located on two sides of the data transfer interface 103 are further provided on the base 110, as shown in FIGS. 2 and 5. Accordingly, corresponding stud holes are provided on connection terminals of the data connection line. After the connection terminals of the data connection line are inserted into the data transfer interface 103, fastening of the data transfer interface 103 and the data connection line is realized by penetrating screws through the stud holes and the screw holes 113 in turn. The screws are preferably manual screws to facilitate removal.

In embodiments of the present disclosure, the data transfer interface 103 may be a Type-C interface. Type-C interface may implement signal transmission between the main control system and the control unit 102 while enabling detachable connection between the main control system and the control unit 102, thereby enabling the driving control device to be used on different vehicles. In addition, Type-C interface may be connected with a plurality of mobile terminals, thereby being expanded to transmit driving control signals with different mobile terminals as signal relaying stations. For example, the driving control signals are transmitted to the mobile phone via the Type-C interface and then transmitted by the mobile phone to the automobile via BlueTooth or other transmission manners, thereby implementing driving control. Of course, the data transfer interface 103 of the present disclosure is not limited to Type-C interface, and may be other interfaces that can implement transmission of driving control signals.

Figure 6:
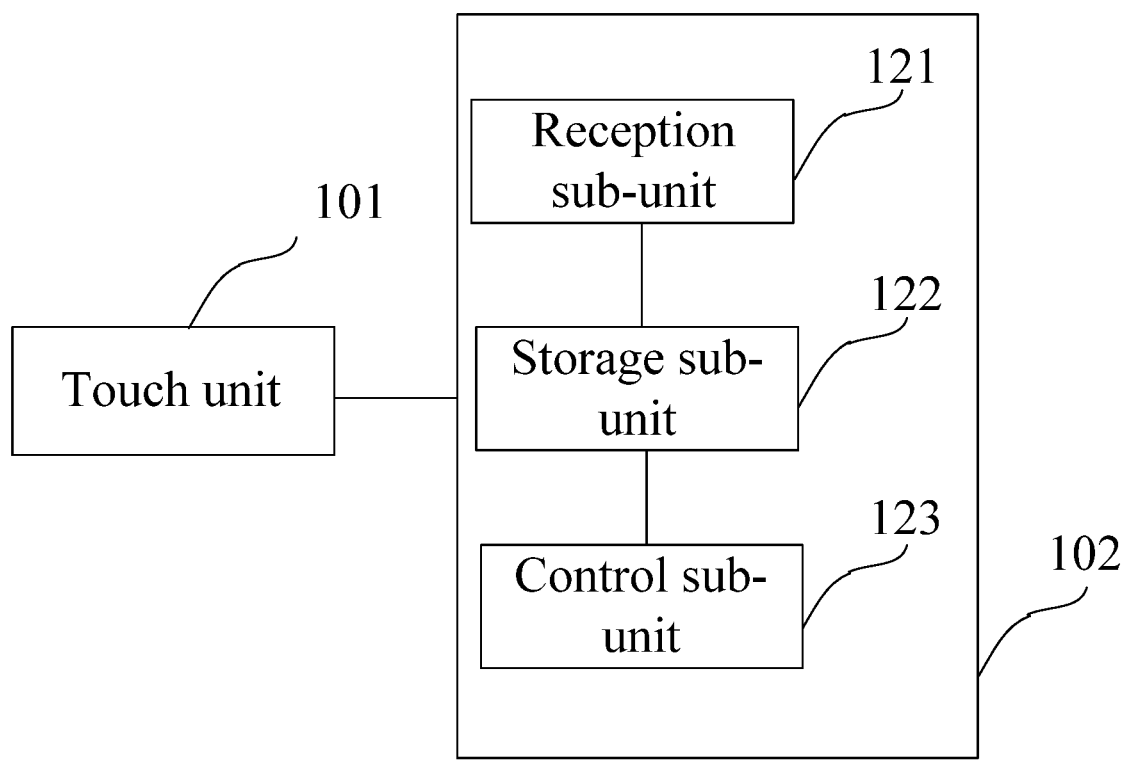
FIG. 6 is a structure block diagram of another driving control device provided in an embodiment of the present disclosure.

FIG. 6 is a structure block diagram of another driving control device provided in an embodiment of the present disclosure. The driving control device shown in FIG. 6 is different from that shown in FIG. 1 only in that the control unit 102 is divided into a plurality of sub-units. Referring to FIG. 6, the control unit 102 includes a reception sub-unit 121, a storage sub-unit 122 and a control sub-unit 123.

The reception sub-unit 121 is configured to receive touch signals generated by the touch unit 101. The storage sub-unit 122 is configured to store fingerprints and functions corresponding to fingerprints as well as the correspondence between the fingerprints and turnings of the vehicle. Functions corresponding to fingerprints include for example controlling direction. The control sub-unit 123 is configured to determine the turning direction and the turning angle of the vehicle according to the fingerprint information in the touch signals received by the reception sub-unit 121, the fingerprints and functions corresponding to fingerprints as well as the correspondence between fingerprints and the turning of vehicle stored in the storage sub-unit 122. The angle as used herein is the angle used when the vehicle turns. Functions of different fingers are determined by fingerprints, and the direction and angle of the turning of the vehicle are determined according to the correspondence between the fingerprints and the turning of vehicle, and the traveling direction is in turn controlled.

In accordance with one embodiment of the present disclosure, the correspondence between the fingerprints and the turning of the vehicle includes the correspondence between the fingerprints and the turning angle. The control sub-unit 123 is configured to compare fingerprints in fingerprint information of the touch signals against fingerprints stored in the storage sub-unit and determine the fingerprint for controlling direction in the fingerprint information according to the function corresponding to the fingerprint stored in the storage sub-unit. The turning direction and the turning angle of the vehicle are determined according to the determined fingerprint for controlling direction and the correspondence between the fingerprint and the turning angle. The turning angle is the angle between the direction into which the vehicle is to turn and the straightforward direction directly in front of the vehicle. Alternatively, the correspondence between the fingerprints and the turning of the vehicle includes the correspondence between the fingerprints and the direction. The control sub-unit 123 is configured to compare fingerprints in fingerprint information of the touch signals against fingerprints stored in the storage sub-unit and determine the fingerprint for controlling direction in the fingerprint information according to the function corresponding to the fingerprint stored in the storage sub-unit; and determine the direction into which the vehicle is to turn according to the determined fingerprint for controlling direction and the correspondence between the fingerprint and the direction.

Furthermore, the control sub-unit 123 may be further configured to determine the touch duration of the fingerprint for controlling direction, and determine the turning angle of the vehicle according to the touch duration. The turning angle of the vehicle increases as touch duration of fingerprint increases.

In order to obtain the touch duration of fingerprint, it is possible to record fingerprints carried in each touch signal. If the same fingerprint appears in subsequent multiple touch signals, this indicates that the finger corresponding to the fingerprint is in a continuous touch state. The time interval between the first touch signal and the last touch signal in these subsequent multiple touch signals is the touch duration of the fingerprint. Generally, the generation and acquisition of touch signals are both periodic.

The control sub-unit 123 may compare fingerprints in fingerprint information of the touch signals against fingerprints stored in the storage sub-unit in the following way. For example, each fingerprint in the fingerprint information is compared to the fingerprints stored in the storage sub-unit one by one. When identical fingerprint is found, the function corresponding to this identical fingerprint is used as the function of the fingerprint.

The reception sub-unit 121 is for example a signal receiver or a data receiver. For example, it includes three parts: a transfer interface, an analog-to-digital converter and a signal amplifier. The storage sub-unit 122 is generally a memory. The control sub-unit 123 may be implemented with a processor chip or a controller chip.

In embodiments of the present disclosure, the function corresponding to each fingerprint may be defined and stored in the storage sub-unit 1022 of the control unit 102 in advance. Specifically, the function corresponding to each fingerprint may be defined manually or automatically by the control unit.

The manual definition is as follows. The control unit 102 acquires the fingerprint information input by the user and acquires input signals corresponding to the fingerprint information, which are used to determine functions corresponding to fingerprints. In order for the user to define fingerprint functions, the driving control device further includes a display screen and the user selects individual fingerprint functions through the display screen and the touch panel. For example, the control unit 102 controls the display screen to provide the user with a fingerprint function definition interface that may include for example, fingerprints input by the user and fingerprint function selection keys. Then selection instructions input by the user through the interface (namely the aforementioned input signals) are received to define the fingerprint functions. In accordance with one embodiment of the present disclosure, the display screen may be provided separately or integrated on the touch panel. Upon selection, it should be considered whether touch screens with the same shape as the touch panels may be practically produced. The automatic definition is as follows. The control unit 102 acquires the fingerprint information input by the user and assigns functions to individual fingerprints. For example, two fingerprints are included in the fingerprint information input by the user. The control unit 102 sets the two fingerprints as left (for left fingerprint) and right (for right fingerprint) respectively according to the left and right positions of the two fingerprints on the touch panel.

In addition, while setting fingerprint functions, the control unit 102 may further compare the acquired fingerprints against fingerprints stored in the storage sub-unit first, and then provide fingerprint function modification function if identical fingerprints already exist. In accordance with one embodiment of the present disclosure, the control unit 102 controls the display screen to provide the user with a fingerprint function modification interface and then receives the selection instruction input by the user via the interface to modify the fingerprint functions.

When the user is inputting fingerprint information, a finger contacting the touch panel will cause change of capacitance and thereby generating touch signals. The touch unit 101 may record fingerprint information in the touch signals as fingerprint samples and then the control unit 102 sets functions for fingerprints according to input signals, or the control unit 102 assigns functions to individual fingerprints automatically.

Functions of individual fingerprints include a plurality of preset functions and the user may determine function of each fingerprint by selection. The preset functions may include controlling direction and controlling upper speed limit. When a fingerprint is used to control direction, it is also possible to select a turning angle corresponding to the fingerprint such as left 10 degrees and right 20 degrees etc; when the fingerprint is used to control upper speed limit, it is also possible to select a correspondence between pressure and upper speed limit. For example, there are three levels for pressure, first level corresponding to 60 km per hour, second level corresponding to 90 km per hour and third level corresponding to 120 km per hour.

In accordance with one example of the present disclosure, there is an one-to-one correspondence between the fingerprints and turning angles, that is, one fingerprint corresponds to one turning angle. Since a human has limited number of fingers, such a configuration can set more turning angles and in turn improving the accuracy of direction control. Of course, the correspondence between the fingerprints and turning angles in the present disclosure is not limited thereto, and may also be that two or more fingerprints correspond to one angle.

In embodiments of the present disclosure, the control sub-unit 123 is configured to determine the turning direction and the turning angle of the vehicle according to at least two turning angles corresponding to at least two fingerprints when the fingerprints that are determined for controlling direction include at least two fingerprints and the at least two fingerprints correspond to at least two turning angles. The traveling direction of the vehicle may be controlled by two or more fingers at the same time and the actual turning direction and the actual turning angle are the result of controlling with two or more fingers. For example, one fingerprint corresponds to an angle of turning left 30 degrees, another fingerprint corresponds to an angle of turning right 20 degrees, then the actual direction is turning left 10 degrees. Alternatively, one fingerprint corresponds to an angle of turning left 10 degrees, another fingerprint corresponds to an angle of turning left 15 degrees, then the actual direction is turning left 25 degrees. The turning angles corresponding to fingerprints may be denoted by positive and negative in addition to left or right. For example, turning left is defined as negative, and turning right is defined as positive. The aforementioned example will be described. One fingerprint corresponds to an angle of −30 degrees, another fingerprint corresponds to an angle of 20 degrees, then the actual direction is −10 degrees.

In embodiments of the present disclosure, when the correspondence between fingerprints and turning angles includes the correspondence between at least two fingerprints and the turning angles, the left/right relationship between directions into which the vehicle is to turn that correspond to the turning angles corresponding to the at least two fingerprints is the same as the left/right relationship between the at least two corresponding fingers. Alternatively, when the correspondence between fingerprints and directions includes the correspondence between at least two fingerprints and the directions, the left/right relationship between directions corresponding to the at least two fingerprints is the same as the left/right relationship between the at least two corresponding fingers. The left/right relationship between directions corresponding to fingerprints of individual fingers corresponds to the left/right relationship between fingers, which facilitates the user's operation. For example, the turning angles corresponding to fingers from left to right of a hand are respectively 20° left, 10° left, 0°, 10° right and 20° right. Alternatively, right index finger, middle finger and ring finger correspond to left, straight and right respectively.

Referring to FIG. 3, fingerprints A, B, C, D and E are fingerprints of five fingers of the user's right hand respectively and correspond to the thumb, index finger, middle finger, ring finger and little finger from left to right respectively. Angles corresponding to these 5 fingerprints may be left 30 degrees, left 10 degrees, 0 degree, right 10 degrees and right 30 degrees respectively. Now, the directions corresponding to individual fingers from left to right are the same as the arrangement of fingers from left to right.

Further, the touch unit 101 is further configured to detect pressure information including pressure applied by the user's fingers on the touch unit. When the pressure of at least one finger in the detected pressure information reaches the threshold, fingerprint information is acquired. The fingerprint information includes fingerprints of all fingers that can be detected by the touch unit or the fingerprint information includes the fingerprint of the finger for which the pressure reaches the threshold. That is, the aforementioned touch panel 111 further has the pressure detection function.

That is, in embodiments of the present disclosure, the driving control device may be turned on by one trigger signal that is at least one finger's pressure reaching the threshold, and then the direction control functions is turned on. When the above-mentioned trigger signal is detected again, it is also possible to turn off the direction control function of the driving control device.

If the palm supporting section 112 already has the function of controlling turning on of the touch panel, after the palm supporting section 112 controls the touch panel to be turned on, it is possible to further turn on the functions of the driving control device by the trigger signal.

Accordingly, the touch signals further include the pressure information, and the functions corresponding to fingerprints further include controlling upper speed limit. The storage sub-unit 122 is further configured to store the correspondence between the pressure and the upper speed limit. The control sub-unit 123 is further configured to determine the upper speed limit of the vehicle according to the fingerprint information in the touch signals, the pressure information in the touch signal, the fingerprints stored in the storage sub-unit and functions corresponding to fingerprints, as well as the correspondence between pressure and upper speed limit stored in the storage sub-unit.

In accordance with one embodiment of the present disclosure, the control sub-unit 123 is configured to compare fingerprints in fingerprint information against fingerprints stored in the storage sub-unit and determine the fingerprint for controlling upper speed limit in the fingerprint information according to the functions corresponding to the fingerprint stored in the storage sub-unit. The pressure corresponding to the fingerprint for controlling upper speed limit is determined according to the fingerprint that is determined for controlling upper speed limit and the pressure information. The upper speed limit of the vehicle is determined according to the pressure corresponding to the fingerprint for controlling upper speed limit and the correspondence between the pressure and the upper speed limit.

In embodiments of the present disclosure, the control sub-unit 123 is configure to determine the upper speed limit for the traveling of vehicle as the first speed when the pressure corresponding to the fingerprint for controlling upper speed limit is the first pressure, determine the upper speed limit for the traveling of vehicle as the second speed when the pressure corresponding to the fingerprint for controlling upper speed limit is the second pressure, and determine the upper speed limit for the traveling of vehicle as the third speed when the pressure corresponding to the fingerprint for controlling upper speed limit is the third pressure. For example, the first speed<the second speed<the third speed. (The symbol "<" means less than). Different pressures correspond to different upper speed limits, which allows the vehicle to travel within the upper speed limit and avoids accidents resulted from unskilled control over throttle by the user. In addition, the upper speed limit is set into 3 levels, which on the one hand facilitates user's operation and on the other hand facilitates pressure detection. The values of the first, second and third speeds may be designed as practically required. For example, the first speed may be the urban speed limit such as 50 km per hour, the second speed may be the speed limit on third ring road, overpasses and so on with such as 70 km per hour, and the third speed may be the speed limit on high ways such as 120 km per hour.

In another implementation, the driving control device may further control the upper speed limit according to fingerprints. Now, the functions corresponding to fingerprints further include controlling speed upper limit. The storage sub-unit 122 is further configured to store the correspondence between fingerprints and upper speed limits; and the control sub-unit 123 is further configured to determine the upper speed limit of the vehicle according to the fingerprint information, the fingerprints stored in the storage sub-unit and functions corresponding to fingerprints, as well as the correspondence between fingerprints and upper speed limits.

In accordance with one embodiment of the present disclosure, the control sub-unit 123 is configured to compare fingerprints in fingerprint information against fingerprints stored in the storage sub-unit and determine the fingerprint for controlling speed upper limit in the fingerprint information according to the functions corresponding to the fingerprint stored in the storage sub-unit. The upper speed limit of the vehicle is determined according to the fingerprint that is determined as controlling upper speed limit and the correspondence between the fingerprints and the upper speed limits.

Further, the control sub-unit 123 is further configured to generate corresponding driving control signals according to the determined turning direction and turning angle of the vehicle and the determined upper speed limit of the vehicle. In other implementations, the control sub-unit 123 may further generate corresponding driving control signals only according to the turning direction and the turning angle of the vehicle or the upper speed limit of the vehicle.

In embodiments of the present disclosure, the fingerprint for controlling upper speed limit may be different from or the same as the fingerprint for controlling direction.

For convenience of controlling, the user may control driving with one hand (left or right hand) or may control driving with both hands.

An embodiment of the present disclosure further provides a vehicle including the driving control device in the above-mentioned embodiments. The aforementioned embodiments are referred to for specifics.

In embodiments of the present disclosure, the control over at least one of the traveling directions and the speed upper limit of a vehicle is implemented by touch operations of the user's finger and the driving control device may be used with the throttle and brake while driving. While controlling direction with the device, the driver simply needs to control direction by touch without keeping rotating the steering wheel, which simplifies the direction control operation, reduces driving difficulty and in turn decreases the driving accident rate. While controlling speed upper limit with the device, the driver sets the speed upper limit for the vehicle by touch such that the speed upper limit will not be exceeded while the driver is driving, which avoids the over speed problem due to improper operation by the driver, reduces the difficulty for the driver to control the throttle and gears, and reduces driving accident rate.

Further, the vehicle may further include a driving unit for receiving driving control signals and controlling the vehicle according to the driving control signals. The driving unit is provided in the vehicle to controlling the turning system and the transmission system of the vehicle according to the driving control signals. In accordance with one embodiment of the present disclosure, the driving unit may include a mechanism for driving the turning system to operate, thereby implementing direction control; and the driving unit may further include a mechanism capable of adjusting gears of the vehicle to thereby control the upper speed limit.

Figure 7:
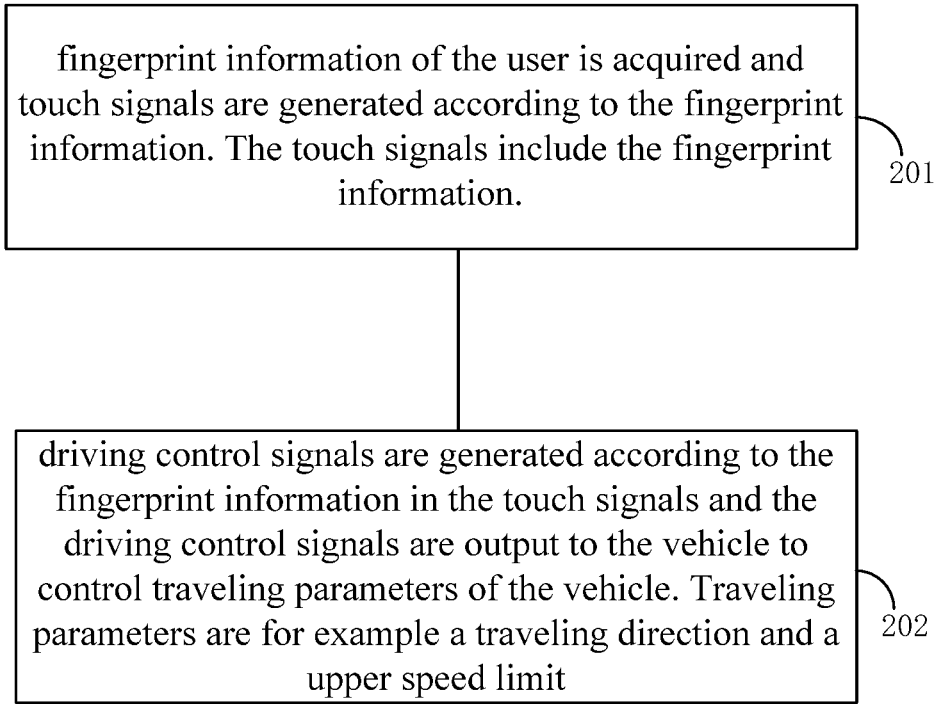
FIG. 7 is a flow chart of a driving control method provided in an embodiment of the present disclosure.

FIG. 7 is the flow chart of a driving control method provided in an embodiment of the present disclosure. The driving control method is implemented based on the aforementioned driving control device. For the brevity of description, it will be described briefly below and aforementioned embodiments may be referred to for details.

Referring to FIG. 7, the driving control method includes steps 201-202.

In step 201, fingerprint information of the user is acquired and touch signals are generated according to the fingerprint information. The touch signals include the fingerprint information.

In step 202, driving control signals are generated according to the fingerprint information in the touch signals and the driving control signals are output to the vehicle to control traveling parameters of the vehicle. Traveling parameters are for example a traveling direction or an upper speed limit.

In embodiments of the present disclosure, the control over at least one of the traveling directions and the speed upper limit of a vehicle is implemented by touch operations of the user's finger and the driving control device may be used with the throttle and brake while driving. While controlling direction with the device, the driver simply needs to control direction by touch without keeping rotating the steering wheel, which simplifies the direction control operation, reduces driving difficulty and in turn decreases the driving accident rate. While controlling speed upper limit with the device, the driver sets the speed upper limit for the vehicle by touch such that the speed upper limit will not be exceeded while the driver is driving, which avoids the over speed problem due to improper operation by the driver, reduces the difficulty for the driver to control the throttle and gears, and reduces driving accident rate.

In embodiments of the present disclosure, generating driving control signals according to fingerprint information in the touch signals includes acquiring fingerprints and functions corresponding to fingerprints, and the correspondence between the fingerprints and the turning of vehicle. Functions corresponding to fingerprints include controlling direction; determining the turning direction and the turning angle of the vehicle according to the fingerprint information in the touch signals, the fingerprints stored in advance and functions corresponding to fingerprints as well as the correspondence between fingerprints and the turning of vehicle; and generating driving control signals according to the direction and angle of turning of the vehicle. Functions of different fingers are determined by fingerprints, and the direction and angle of the turning of the vehicle are determined according to the correspondence between the fingerprints and the turning of vehicle, and the traveling direction is in turn controlled.

Description of the control unit in the aforementioned device section may be referred to for details of how to determine the turning direction and the turning angle of the vehicle.

Functions of individual fingerprints have been defined in advance and stored in the driving control device. Specifically, the function corresponding to each fingerprint may be defined manually or automatically.

The manual definition is as follows. The driving control device acquires the fingerprint information input by the user and acquires input signals corresponding to the fingerprint information, which are used to determine functions corresponding to fingerprints. In order for the user to define fingerprint functions, the driving control device further includes a display screen and the user selects individual fingerprint functions through the display screen and the touch panel. In accordance with one embodiment of the present disclosure, the display screen may be provided separately or integrated on the touch panel to form a touch screen. Upon selection, it should be considered whether touch screens with the same shape as the touch panels may be practically produced. The automatic definition is as follows. Fingerprint information input by the user is acquired and functions are assigned to individual fingerprints automatically.

When the user is inputting fingerprint information, the finger contacting the touch panel may cause capacitance variation to thereby generate touch signals. The driving control device may record fingerprint information in the touch signals as fingerprint samples and then sets functions for fingerprints according to input signals, or assigns functions to individual fingerprints automatically.

Functions of individual fingerprints include a plurality of preset functions and the user may determine function of each fingerprint by selection. The preset functions may include controlling direction and controlling speed upper limit. When the fingerprint is used to control direction, it is also possible to select turning angle corresponding to the fingerprint, such as left 10 degrees and right 20 degrees. When the fingerprint is used to control speed upper limit, it is also possible to select a correspondence between pressure and speed upper limit. For example, there are three levels for pressure, first level corresponding to 60 km per hour, second level corresponding to 90 km per hour and third level corresponding to 120 km per hour.

In accordance with one embodiment of the present disclosure, in embodiments of the present disclosure, the correspondence between the fingerprints and turning angles is that one fingerprint corresponds to one turning angle. Since a human has limited number of fingers, such a configuration can set more turning angles and in turn improving the accuracy of direction control. Of course, the correspondence between the fingerprints and turning angles in the present disclosure is not limited thereto, and may also be that two or more fingerprints correspond to one angle.

In embodiments of the present disclosure, the turning direction and the turning angle of the vehicle are determined according to at least two turning angles corresponding to at least two fingerprints when the fingerprints that are determined for controlling direction include at least two fingerprints and the at least two fingerprints correspond to at least two turning angles. The traveling direction of the vehicle may be controlled by multiple fingers at the same time and the actual turning direction and the turning angle are the result of controlling with two or more fingers. For example, one fingerprint corresponds to an angle of turning left 30 degrees, another fingerprint corresponds to an angle of turning right 20 degrees, then the actual direction is left 10 degrees. Alternatively, one fingerprint corresponds to an angle of turning left 10 degrees, another fingerprint corresponds to an angle of turning left 15 degrees, then the actual direction is left 25 degrees. The turning angles corresponding to fingerprints may be denoted by positive and negative in addition to left or right. For example, left is defined as negative, and right is defined as positive. The aforementioned example will be described. One fingerprint corresponds to an angle of −30 degrees, another fingerprint corresponds to an angle of 20 degrees, then the actual direction is −10 degrees.

In embodiments of the present disclosure, when the correspondence between fingerprints and turning angles includes the correspondence between at least two fingerprints and the turning angles, the left/right relationship between directions into which the vehicle is to turn that correspond to the turning angles corresponding to the at least two fingerprints is the same as the left/right relationship between the at least two corresponding fingers. Alternatively, when the correspondence between fingerprints and directions includes the correspondence between at least two fingerprints and the directions, the left/right relationship between directions corresponding to the at least two fingerprints is the same as the left/right relationship between the at least two corresponding fingers. The left/right relationship between directions corresponding to fingerprints of individual fingers corresponds to the left/right relationship between fingers, which facilitates the user's operation. For example, the turning angles corresponding to fingers from left to right of a hand are respectively 20° left, 10° left, 0°, 10° right and 20° right. Alternatively, the right index finger, middle finger and ring finger correspond to left, straight and right respectively.

Referring to FIG. 3, fingerprints A, B, C, D and E are fingerprints of five fingers of the user's right hand respectively and correspond to the thumb, index finger, middle finger, ring finger and little finger from left to right respectively. Angles corresponding to these 5 fingerprints may be left 30 degrees, left 10 degrees, 0 degree, right 10 degrees and right 30 degrees respectively. Now, the directions corresponding to individual fingers from left to right are the same as the arrangement of fingers from left to right.

Further, the method may further include detecting pressure information including pressure applied by the user's fingers on the touch unit. When the pressure of at least one finger in the detected pressure information reaches the threshold, fingerprint information is acquired. The fingerprint information includes fingerprints of all fingers that can be detected or the fingerprint information includes the fingerprint of the finger for which the pressure reaches the threshold.

That is, in embodiments of the present disclosure, the driving control device may be turned on by one trigger signal that is at least one finger's pressure reaching the threshold, and then the direction control functions is turned on. When the above-mentioned trigger signal is detected again, it is also possible to turn off the direction control function of the driving control device.

Accordingly, the touch signals further include the pressure information, and the functions corresponding to fingerprints further include controlling speed upper limit. Now, step 202 may further include acquiring fingerprints stored in advance and functions corresponding to fingerprints, and the correspondence between the pressures and the upper speed limits. The functions corresponding to the fingerprints include controlling upper speed limit. The upper speed limit of the vehicle is determined according to the fingerprint information in the touch signals, the fingerprints stored in advance and functions corresponding to fingerprints, as well as the correspondence between pressure and upper speed limit.

In embodiments of the present disclosure, the upper speed limit for the traveling of vehicle is determined as the first speed when the pressure corresponding to the fingerprint for controlling upper speed limit is the first pressure, the upper speed limit for the traveling of vehicle is determined as the second speed when the pressure corresponding to the fingerprint for controlling upper speed limit is the second pressure, and the upper speed limit for the traveling of vehicle is determined as the third speed when the pressure corresponding to the fingerprint for controlling upper speed limit is the third pressure. For example, the first speed<the second speed<the third speed. Different pressures correspond to different upper speed limits, which allows the vehicle to travel within the upper speed limit and avoids accidents resulted from unskilled control over throttle by the user. In addition, the upper speed limit is set into 3 levels, which on the one hand facilitates user's operation and on the other hand facilitates pressure detection. The values of the first, second and third speeds may be designed as practically required. For example, the first speed may be the urban speed limit such as 50 km per hour, the second speed may be the speed limit on third ring road and overpasses such as 70 km per hour, and the third speed may be the speed limit on high ways such as 120 km per hour.

In another implementation, it is also possible to further control the upper speed limit according to fingerprints directly. Now, the functions corresponding to fingerprints further include controlling speed upper limit. Now, step 202 may further include acquiring fingerprints stored in advance and functions corresponding to fingerprints, and the correspondence between the fingerprints and the upper speed limits. The functions corresponding to the fingerprints include controlling upper speed limit. The upper speed limit of the vehicle is determined according to the fingerprint information in the touch signals, the fingerprints stored in advance and functions corresponding to fingerprints, as well as the correspondence between fingerprint and upper speed limit.

Further, it is also possible to generate corresponding driving control signals according to the determined the turning direction and the turning angle of the vehicle and the determined upper speed limit of the vehicle. In other implementations, it is also possible to generate corresponding driving control signals according to only the upper speed limit of the vehicle.

In the above two implementations, description of the control unit in the aforementioned device section may be referred to for details of how to determine the upper speed limit of the vehicle.

In embodiments of the present disclosure, the fingerprint for controlling upper speed limit may be different from or the same as the fingerprint for controlling direction.

For convenience of controlling, the user may control driving with one hand (left or right hand) or may control driving with both hands.

In embodiments of the present disclosure, the above driving control device section may be referred to for details of the driving control method.

What have been described above are merely preferred embodiments of the present disclosure rather than limiting the present disclosure. Any modifications, equivalent substitutions and improvements made in the spirit and principle of the present disclosure should be encompassed in the scope of the present disclosure.

The present application claims priority of Chinese Patent Application No. 201710313884.X filed on May 5, 2017, the content of which is hereby incorporated herein in its entirety by reference as a part of the present application.

What is claimed is:

1. A driving control device, comprising:
   a touch unit configured to acquire fingerprint information of a user and generate touch signals according to the fingerprint information, the touch signals comprising the fingerprint information; and
   a controller configured to generate driving control signals according to the fingerprint information in the touch signals and output the driving control signals to a vehicle to control traveling parameters of the vehicle, wherein the traveling parameters comprise at least one of a traveling direction or a traveling speed, wherein the controller comprises:
   a receiver configured to receive the touch signals;
   a memory configured to store a fingerprint and a function corresponding to the fingerprint as well as a correspondence between the fingerprint and a turning of the vehicle, wherein the function corresponding to the fingerprint comprises controlling direction; and
   a sub-controller configured to determine a turning direction and a turning angle of the vehicle according to the fingerprint information in the touch signals received by the receiver, the fingerprint and the function corresponding to the fingerprint, and the correspondence between the fingerprint and the turning of the vehicle stored in the memory.

2. The driving control device according to claim 1, wherein the correspondence between the fingerprint and the turning of the vehicle comprises a correspondence between the fingerprint and the turning angle;
   the sub-controller is further configured to compare the fingerprint in the fingerprint information of the touch signals against the fingerprint stored in the memory and determine a fingerprint for controlling direction in the fingerprint information according to the function corresponding to the fingerprint stored in the memory; and determine the turning direction and the turning angle of the vehicle according to the fingerprint that is determined for controlling direction and the correspondence between the fingerprint and the turning angle, wherein the turning angle is an angle between a direction into which the vehicle is to turn and a straightforward direction directly in front of the vehicle.

3. The driving control device according to claim 1, wherein the correspondence between the fingerprint and the turning of the vehicle comprises the correspondence between the fingerprint and directions;
   the sub-controller is further configured to compare the fingerprint in the fingerprint information of the touch signals against the fingerprint stored in the memory and determine a fingerprint configured to control direction in the fingerprint information according to the function corresponding to the fingerprint stored in the memory; and determine the turning direction of the vehicle according to the fingerprint that is determined to be configured to control direction and the correspondence between the fingerprint and directions.

4. The driving control device according to claim 3, wherein the sub-controller is further configured to determine a touch duration of the fingerprint configured to control direction, and determine the turning angle of the vehicle according to the touch duration, in which the turning angle of the vehicle increases as the touch duration of the fingerprint increases.

5. The driving control device according to claim 2, wherein when the fingerprint for controlling direction comprises at least two fingerprints and the at least two fingerprints correspond to at least two turning angles, the sub-controller is configured to determine the turning direction and the turning angle of the vehicle according to the at least two turning angles.

6. The driving control device according to claim 1, wherein the touch unit is further configured to detect pressure information, the pressure information comprises a pressure applied on the touch unit by a finger of the user; and acquire the fingerprint information when a pressure of at least one finger in the detected pressure information reaches a threshold,
   wherein the fingerprint information comprises fingerprints of all fingers that can be detected by the touch unit, or the fingerprint information comprises a fingerprint of a finger applying pressure that reaches the threshold.

7. The driving control device according to claim 6, wherein the touch signals further comprise the pressure information, and the function corresponding to the fingerprint further comprises controlling an upper speed limit;
the memory is further configured to store a correspondence between the pressure and the upper speed limit; and
the sub-controller is further configured to determine the upper speed limit according to the fingerprint information in the touch signals, the pressure information in the touch signals, the fingerprint and the function corresponding to fingerprint, as well as the correspondence between the pressure and the upper speed limit stored in the memory.

8. The driving control device according to claim 7, wherein the sub-controller is configured to compare the fingerprint in the fingerprint information against the fingerprint stored in the memory, and determine a fingerprint that is configured to control the upper speed limit in the fingerprint information according to the function corresponding to the fingerprint stored in the memory; determine a pressure corresponding to the fingerprint that is determined for controlling the upper speed limit according to the fingerprint that is determined to be configured to control the upper speed limit and the pressure information; and determine the upper speed limit of the vehicle according to the pressure corresponding to the fingerprint configured to control the upper speed limit and the correspondence between the pressure and the upper speed limit.

9. The driving control device according to claim 7, wherein the function corresponding to the fingerprint further comprises controlling the upper speed limit;
the memory is further configured to store the correspondence between the fingerprint and the upper speed limit; and
the sub-controller is further configured to determine the upper speed limit of the vehicle according to the fingerprint information, the fingerprint and the function corresponding to fingerprint, as well as the correspondence between fingerprint and upper speed limits stored in the memory.

10. The driving control device claim 7, wherein the sub-controller is further configured to generate corresponding driving control signals according to the turning direction and the turning angle of the vehicle and the upper speed limit of the vehicle.

11. The driving control device according to claim 1, wherein the touch unit comprises a base and a touch panel on the base.

12. The driving control device according to claim 11, wherein the touch panel is a semi-sphere touch panel or a curved surface touch panel.

13. The driving control device according to claim 11, wherein the touch unit further comprises a palm supporting section over the touch panel.

14. The driving control device according to claim 13, wherein the palm supporting section is configured to acquire palmprint information of the user; and
the controller is further configured to compare the palmprint information and preset palmprint information and control the touch panel to be turned on when the palmprint information is identical to the preset palmprint information.

15. The driving control device according to claim 11, wherein the controller is within the base, and the driving control device further comprises a data transfer interface on the base, and
wherein the controller is electrically connected with the vehicle through the data transfer interface.

16. A vehicle, comprising the driving control device of claim 1.

17. The vehicle according to claim 16, wherein the vehicle further comprises a driving unit configured to receive the driving control signals and control the vehicle according to the driving control signals.

* * * * *